United States Patent
Morita

(10) Patent No.: US 9,333,807 B2
(45) Date of Patent: May 10, 2016

(54) PNEUMATIC TIRE

(75) Inventor: Kenichi Morita, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 1508 days.

(21) Appl. No.: 13/013,588

(22) Filed: Jan. 25, 2011

(65) Prior Publication Data

US 2011/0180190 A1     Jul. 28, 2011

(30) Foreign Application Priority Data

Jan. 27, 2010   (JP) .................................. 2010-015096

(51) Int. Cl.
*B60C 11/00* (2006.01)
*B60C 11/03* (2006.01)

(52) U.S. Cl.
CPC ........... *B60C 11/0306* (2013.04); *B60C 11/033* (2013.04); *B60C 11/0309* (2013.04); *B60C 11/0318* (2013.04); *B60C 2011/0325* (2013.04); *B60C 2011/0365* (2013.04); *B60C 2011/0367* (2013.04); *B60C 2011/0369* (2013.04)

(58) Field of Classification Search
CPC ........... B60C 11/0318; B60C 11/0306; B60C 11/0309; B60C 11/033; B60C 11/0327; B60C 2011/0325; B60C 2011/0365; B60C 2011/0367
USPC .................. 152/209.2, 209.3, 209.27, 209.18, 152/209.24, 29.25
IPC ...................................................... B60C 11/00
See application file for complete search history.

(56) References Cited

U.S. PATENT DOCUMENTS

| 7,975,738 B2 | 7/2011 | Ohki | |
| 2011/0048598 A1* | 3/2011 | Ohki | .................. 152/209.3 |

FOREIGN PATENT DOCUMENTS

| JP | 63275407 A | * 11/1988 | .............. B60C 11/11 |
| JP | S63-275407 | 11/1988 | |
| JP | H11-078425 | 3/1999 | |
| JP | H11-291714 | 10/1999 | |
| JP | 2002-012006 | 1/2002 | |
| JP | 2004-210133 | 7/2004 | |
| WO | WO 2008/062640 | * 5/2008 | .............. B60C 11/03 |

OTHER PUBLICATIONS

Human Translation of JP63-275407 (Sep. 2014).*

* cited by examiner

*Primary Examiner* — Justin Fischer
*Assistant Examiner* — Philip N Schwartz
(74) *Attorney, Agent, or Firm* — Thorpe North & Western

(57) ABSTRACT

A pneumatic tire having a tread portion including land portions formed by vertical grooves provided in a tire circumferential direction and lateral grooves provided so as to intersect with the vertical grooves, the lateral grooves being disposed in the tire circumferential direction having a plurality of pitches P1, P2, and P3, wherein in a shoulder region of the tread portion, as a pitch decreases a volume ratio of the lateral grooves with respect to a pitch volume thereof increases; and, in a center region of the tread portion, as a pitch decreases the volume ratio of the lateral grooves with respect to a pitch volume thereof decreases.

14 Claims, 4 Drawing Sheets

|  | Conventional Example | Example 1 | Example 2 | Example 3 | Example 4 | Example 5 | Example 6 | Example 7 | Example 8 |
| --- | --- | --- | --- | --- | --- | --- | --- | --- | --- |
| Center region volume ratio difference (Maximum Pitch - Minimum Pitch) | -1.0 | 0.5 | 1.0 | 1.5 | 2.0 | 0.5 | 1.0 | 1.5 | 2.0 |
| Shoulder region volume ratio difference (Minimum Pitch - Maximum Pitch) | 1.0 | 0.5 | 0.5 | 0.5 | 0.5 | 1.5 | 1.5 | 1.5 | 1.5 |
| Steering stability (initial response) | 100 | 103 | 105 | 107 | 108 | 103 | 105 | 107 | 108 |
| Uniformity | 100 | 100 | 99 | 98 | 97 | 100 | 100 | 98 | 97 |

FIG. 5

PNEUMATIC TIRE

PRIORITY CLAIM

This application is based upon and claims the benefit of priority from Japanese Patent Application No. 2010-015096, filed Jan. 27, 2010, the entire contents of which is incorporated herein by reference.

BACKGROUND

1. Technical Field

The present technology relates to a pneumatic tire employing a variable pitch construction, the pneumatic tire having enhanced steering stability and uniformity.

2. Related Art

Pneumatic tires exist that have tread patterns in tread portions formed from vertical grooves provided in a circumferential direction and lateral grooves provided so as to intersect these vertical grooves. In such a pneumatic tire, by employing a variable pitch construction, wherein the lateral grooves are provided in the tire circumferential direction with a plurality of pitches, pitch noise generated in the tire circumferential direction is dispersed over a wide range of frequencies, leading to an improvement in noise properties.

For example, Japanese Unexamined Patent Application Publication No. 2004-210133 describes a pneumatic tire employing a variable pitch construction, wherein, in order to improve uniformity (poor uniformity in a pneumatic tire is a cause of vibration being generated in a steering wheel or a vehicle) a groove cross-sectional area of the lateral grooves is adjusted and a stiffness of a tread portion with respect to a tire radial direction is made uniform in the tire circumferential direction.

In Japanese Unexamined Patent Application Publication No. 2004-210133 described above, the stiffness of a tread portion is defined by an amount of vulcanized rubber pressed in during tire formation. Therefore, with the pneumatic tire described in Japanese Unexamined Patent Application Publication No. 2004-210133, the amount of vulcanized rubber pressed in is made uniform. As a result because the amount of vulcanized rubber pressed in is adjusted, there is a tendency for the volume of the lateral grooves to increase at areas of small pitch and the stiffness of land portions formed from the vertical grooves and lateral grooves in the tread portion to decrease. When a stiffness of land portions in a center region adjacent to a tire equatorial plane declines, there is a tendency for steering stability to decline.

In light of the foregoing, an object of the present technology is to provide a pneumatic tire in which steering stability can be improved while uniformity is maintained for a pneumatic tire employing a variable pitch construction.

SUMMARY

The pneumatic tire of the present technology includes a tread portion having vertical grooves provided in a tire circumferential direction and lateral grooves provided so as to intersect with the vertical grooves, the lateral grooves being disposed in the tire circumferential direction having a plurality of pitches, wherein, in shoulder regions of the tread portion, as a pitch decreases a volume ratio of the lateral grooves with respect to a pitch volume thereof increases; and, in a center region of the tread portion, as a pitch decreases the volume ratio of the lateral grooves with respect to a pitch volume thereof decreases.

According to an example of a pneumatic tire, as the pitch decreases in the shoulder regions of the tread portion, the volume ratio of the lateral grooves with respect to the pitch volume thereof is increased. Therefore, compared to a case where a variable pitch construction is employed in which the volume of the lateral grooves is constant, because the volume ratio of the lateral grooves increases the smaller the pitch of land portions having small volumes becomes, the amount of vulcanized rubber pressed in during tire formation at each pitch (circumferential direction) is made uniform. As a result, uniformity in the shoulder regions, which, if poor, can be a cause of vibration being generated in a steering wheel or a vehicle, can be improved. In one example of a pneumatic tire, as the pitch decreases in the center region of the tread portion, the volume ratio of the lateral grooves with respect to the pitch volume thereof is decreased. Therefore, compared to a case where a variable pitch construction is employed in which the volume of the lateral grooves is constant, because the volume ratio of the lateral grooves decreases the smaller the pitch of land portions having small volumes becomes, the stiffness of the land portions at each pitch (circumferential direction) is made uniform. As a result, portions of the land portions in the center region experiencing extreme decreases in stiffness will be eliminated and, therefore, steering stability can be improved. Therefore, steering stability can be improved while uniformity is maintained.

Additionally, with the pneumatic tire of the present technology, the volume ratio of the lateral grooves is set by changing a groove width of the lateral grooves.

With this pneumatic tire, the aforementioned effects can be obtained with the configuration described above.

Additionally, with the pneumatic tire of the present technology, the volume ratio of the lateral grooves is set by changing a groove wall angle of the lateral grooves.

With this pneumatic tire, the aforementioned effects can be obtained with the configuration described above.

Additionally, with the pneumatic tire of the present technology, the volume ratio of the lateral grooves is set by changing a groove depth of the lateral grooves.

With this pneumatic tire, the aforementioned effects can be obtained with the configuration described above.

With the pneumatic tire of the present technology, steering stability can be improved while uniformity is maintained in a pneumatic tire employing a variable pitch construction.

BRIEF DESCRIPTION OF THE DRAWINGS

FIG. 5 is a table showing results of performance testing of pneumatic tires according to examples of the present technology.

DETAILED DESCRIPTION

An embodiment of the present technology is described below in detail based on the drawings. However, the present technology is not limited to this embodiment. Furthermore, the constituents of this embodiment include elements that are essentially identical or that can be easily substituted by one skilled in the art. Furthermore, the multiple modified examples described in the embodiment can be arbitrarily combined by one skilled in the art.

In the following description, "tire width direction" refers to a direction that is parallel with a rotational axis (not shown) of a pneumatic tire 1, "tire width direction inner side" refers to a side facing a tire equatorial plane (tire equator) C in the tire width direction, and "tire width direction outer side" refers to a side distanced from the tire equatorial plane C in the tire width direction. Furthermore, "tire circumferential direction" refers to a circumferential direction with the rotational axis as a center axis. Furthermore, "tire radial direction" refers to a direction orthogonal to the rotational axis, "tire radial direction inner side" refers to a side facing the rotational axis in the tire radial direction; and "tire radial direction outer side" refers to a side distanced from the rotational axis in the tire radial direction. "Tire equatorial plane C" refers to a plane that is orthogonal to the rotational axis of the pneumatic tire 1 and that passes through a center of a tire width of the pneumatic tire 1. "Tire equator" refers to a line in the circumferential direction of the pneumatic tire 1 that lies on the tire equatorial plane C. In the present embodiment, "tire equator" is given the same "C" reference symbol as that used for the tire equatorial plane.

Figure 1:
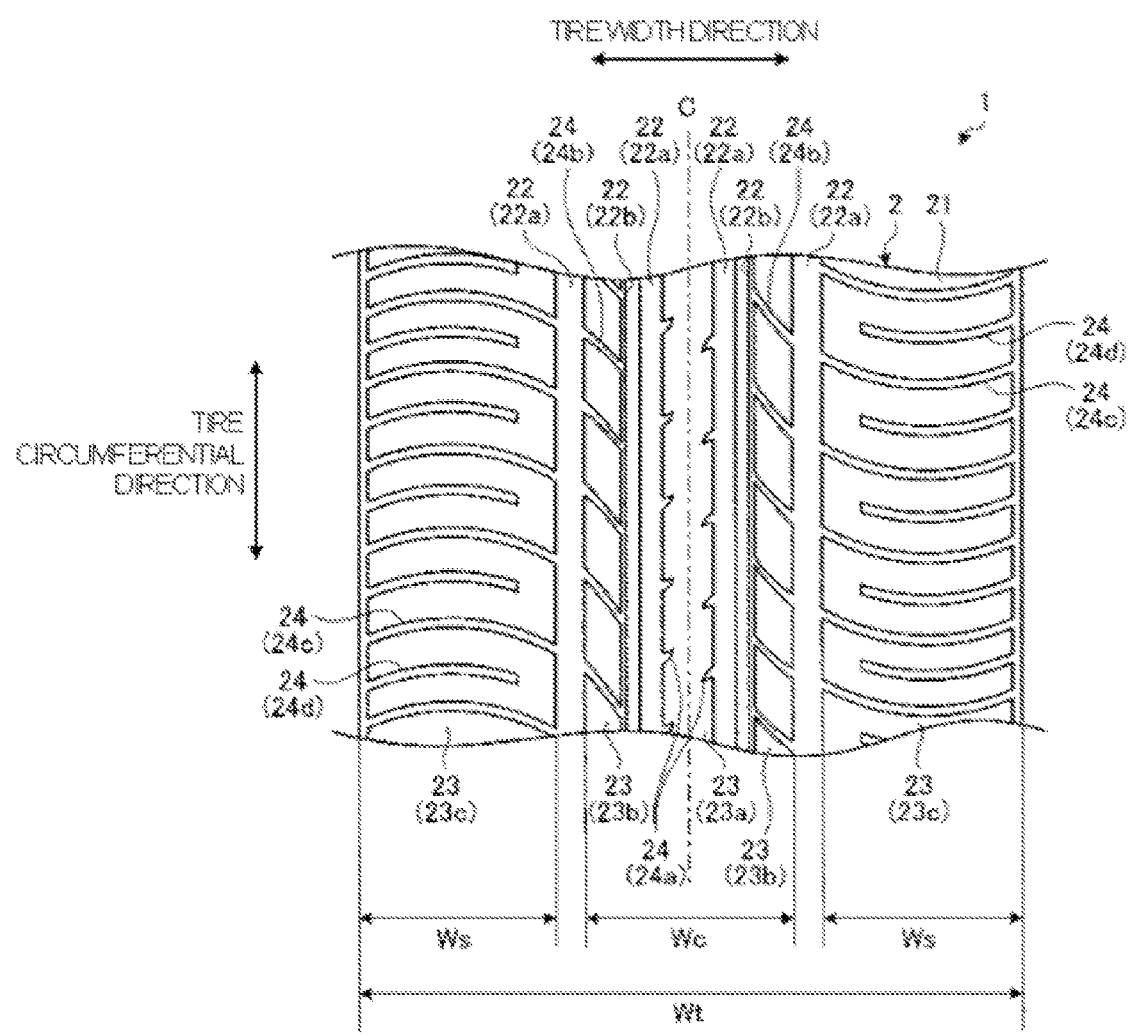
FIG. 1 is a plan view of a pneumatic tire according to an embodiment of the present technology.

The pneumatic tire 1 of the present embodiment is appropriate for use as a tire to be mounted on a conventional passenger car. As illustrated in FIG. 1, the pneumatic tire 1 has a tread portion 2. The tread portion 2 is formed from a rubber material, is exposed on the outermost side in the tire radial direction of the pneumatic tire 1, and a surface thereof constitutes a profile of the pneumatic tire 1. The surface of the tread portion 2 is formed as a tread surface 21, which is a surface that contacts a road surface when a vehicle (not shown in the drawings) upon which the pneumatic tire 1 is mounted is traveling.

A plurality of vertical grooves 22 extending in the tire circumferential direction is provided in the tread surface 21. The vertical grooves 22 of the present embodiment include four circumferential main grooves 22a and two circumferential narrow grooves 22b provided in the tread surface 21. Moreover, a plurality of rib-like land portions 23 extending in the tire circumferential direction and parallel with the tire equator C is formed in the tread surface 21 by the plurality of the circumferential main grooves 22a. Five rows of the land portions 23 of the present embodiment are provided in the tread surface 21 having the circumferential main grooves 22a as boundaries. The land portions 23 include a first land portion 23a disposed on the tire equator C, a second land portion 23b disposed on a tire width direction outer side of the first land portion 23a, and a third land portion 23c disposed on the tire width direction outer side of the second land portion 23b, which is an outermost side in the tire width direction of the tread surface 21. The second land portion 23b includes the circumferential narrow grooves 22b.

Lateral grooves 24 that intersect with the vertical grooves 22 (the circumferential main grooves 22a) are provided in each of the land portions 23 (23a, 23b, 23c) in the tread surface 21. The lateral grooves 24 provided in the first land portion 23a have one end open to the circumferential main grooves 22a and another end closed, and are formed as protruding grooves 24a that are inclined in the tire width direction and the tire circumferential direction. The protruding grooves 24a are formed so that inclining directions of opposing protruding grooves 24a are opposite directions with the tire equator C located between the opposing protruding grooves 24a.

Additionally, the lateral grooves 24 provided in the second land portion 23b have one end open to the circumferential main grooves 22a on the tire width direction outer side and another end open to the circumferential narrow grooves 22b, and are formed as angled grooves 24b that curve while inclining in the tire width direction and the tire circumferential direction. The angled grooves 24b are formed so that inclining directions of opposing angled grooves 24b are opposite directions with the tire equator C located between the opposing angled grooves 24b.

Additionally, the lateral grooves 24 provided in the third land portion 23c are formed as first arched grooves 24c that curve while extending from an outermost edge in the tire width direction of the tread surface 21 to a tire width direction inner side, an extending end thereof being open to the circumferential main grooves 22a; and second arched grooves 24d that curve while extending from the outermost edge in the tire width direction of the tread surface 21 to the tire width direction inner side, an extending end thereof being closed. The first arched grooves 24c and the second arched grooves 24d are disposed alternately in the tire circumferential direction. The first arched grooves 24c and the second arched grooves 24d are formed so that curving directions of opposing first arched grooves 24c and opposing second arched grooves 24d are opposite directions with the tire equator C located between the opposing first arched grooves 24c and the opposing second arched grooves 24d.

A variable pitch construction in which the lateral grooves 24 are disposed in the tire circumferential direction having a plurality of pitches is applied to the pneumatic tire 1 of the present embodiment described above. Due to this variable pitch construction, pitch noise generated in the tire circumferential direction is dispersed over a wide range of frequencies, leading to an improvement in noise properties. Note that the pitches may be arranged periodically or disposed arbitrarily in the tire circumferential direction.

With the pneumatic tire 1 of the present embodiment, in the variable pitch construction, a volume ratio of the lateral grooves 24 with respect to a pitch volume is set. The pitch volume is defined as the volume of the land portions 23 including the lateral grooves 24, and a range in the tire circumferential direction is a one pitch section formed by the disposition of the lateral grooves 24 extending to a belt layer 3 that is the tire radial direction outermost side; and a range in the tire width direction is a groove surface of the circumferential main grooves 22a that forms the land portions 23 extending to the belt layer 3 that is the tire radial direction outermost side. Additionally, the volume ratio of the lateral grooves 24 is defined as a proportion of the pitch volume accounted for by a groove inner volume of the lateral grooves 24.

Regarding setting of the volume ratio, in a shoulder region Ws of the tread portion 2 as illustrated in FIG. 1, as a pitch decreases the volume ratio of the lateral grooves 24 with respect to the pitch volume thereof is increased; and, in a center region Wc of the tread portion 2, as a pitch decreases the volume ratio of the lateral grooves 24 with respect to the pitch volume thereof is decreased. Here, the shoulder region Ws is a region of the tire width direction outer side of the circumferential main groove 22a positioned on the tire width direction outer side of a center 35% of a development width Wt (distance between both edges of the tread surface 21 in the tire width direction); and the center region Wc is a region of the tire width direction inner side of the circumferential main groove 22a that is positioned on the tire width direction outer side of a center 35% of the development width Wt.

The volume ratio of the lateral grooves 24 with respect to the pitch volume is set by changing at least one of a groove width (groove opening dimension in the tire circumferential direction) W of the lateral grooves 24, a groove wall angle (angle of a groove wall with respect to a normal line of the tread surface 21 in the tire circumferential direction) θ of the lateral grooves 24, and a groove depth D of the lateral grooves 24.

Figure 2:
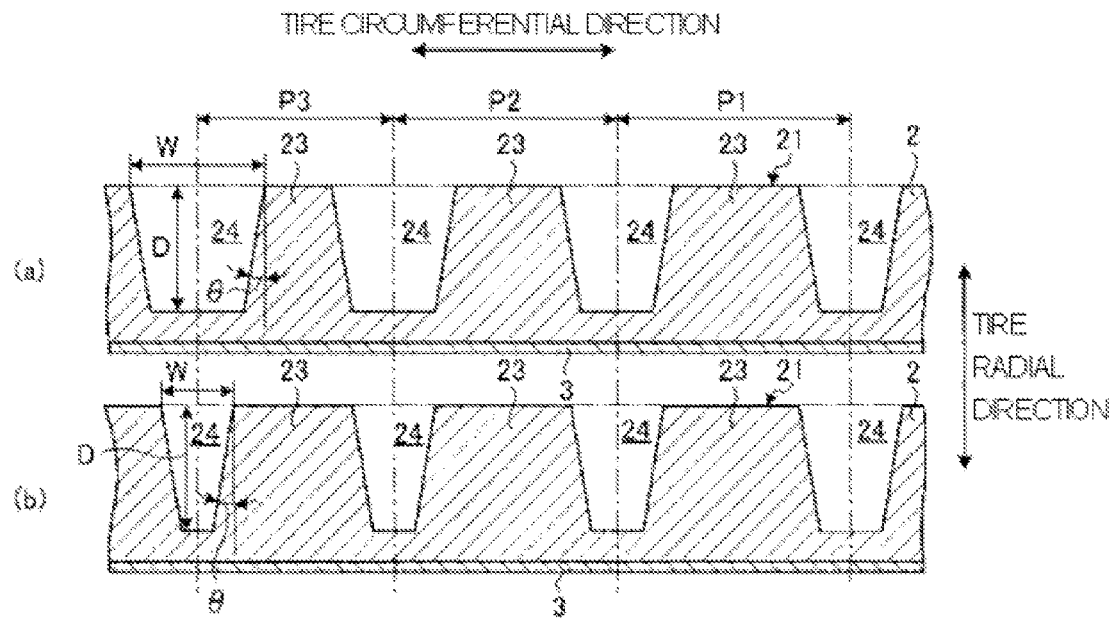
FIG. 2 is a simplified cross-sectional view in a tire circumferential direction of the lateral grooves illustrated in FIG. 1.

FIG. 2 illustrates an example where the volume ratio of the lateral grooves 24 with respect to the pitch volume is set by making the groove wall angle θ and the groove depth D of the lateral grooves 24 constant while changing the groove width W. Additionally, FIG. 2(a) illustrates the land portions 23 of the shoulder region Ws, and FIG. 2(b) illustrates the land portions 23 of the center region Wc. Moreover, in FIG. 2, centers of the lateral grooves 24 in the tire circumferential direction are illustrated as delimiters of the pitches, and the pitches are illustrated as becoming smaller from a pitch P1, to a pitch P2 and to a pitch P3.

Specifically, as illustrated in FIG. 2(a), in the shoulder region Ws of the tread portion 2, by increasing a groove volume by increasing the groove width W as the pitch decreases, the volume ratio of the lateral grooves 24 with respect to the pitch volume thereof is set to be large. On the other hand, as illustrated in FIG. 2(b), in the center region Wc of the tread portion 2, by decreasing the groove volume by decreasing the groove width W as the pitch decreases, the volume ratio of the lateral grooves 24 with respect to the pitch volume thereof is set to be small.

Figure 3:
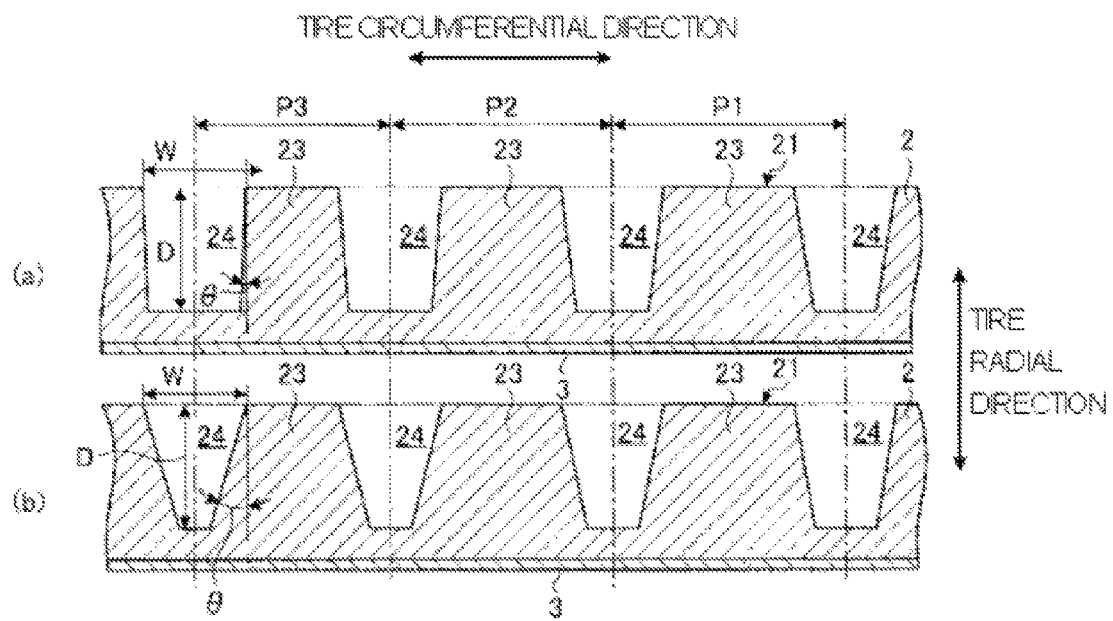
FIG. 3 is a simplified cross-sectional view in a tire circumferential direction of the lateral grooves illustrated in FIG. 1.

FIG. 3 illustrates an example where the volume ratio of the lateral grooves 24 with respect to the pitch volume is set by making the groove width W and the groove depth D of the lateral grooves 24 constant while changing the groove wall angle θ. Additionally, FIG. 3(a) illustrates the land portions 23 of the shoulder region Ws, and FIG. 3(b) illustrates the land portions 23 of the center region Wc. Moreover, in FIG. 3, centers of the lateral grooves 24 in the tire circumferential direction are illustrated as delimiters of the pitches, and the pitches are illustrated as becoming smaller from a pitch P1, to a pitch P2 and to a pitch P3.

Specifically, as illustrated in FIG. 3(a), in the shoulder region Ws of the tread portion 2, by increasing a groove volume by decreasing the groove wall angle θ as the pitch decreases (specifically, by straightening the groove walls of the lateral grooves 24), the volume ratio of the lateral grooves 24 with respect to the pitch volume thereof is set to be large. On the other hand, as illustrated in FIG. 3(b), in the center region Wc of the tread portion 2, by decreasing the groove volume by increasing the groove wall angle θ as the pitch decreases (specifically, by inclining the groove walls of the lateral grooves 24), the volume ratio of the lateral grooves 24 with respect to the pitch volume thereof is set to be small.

Figure 4:
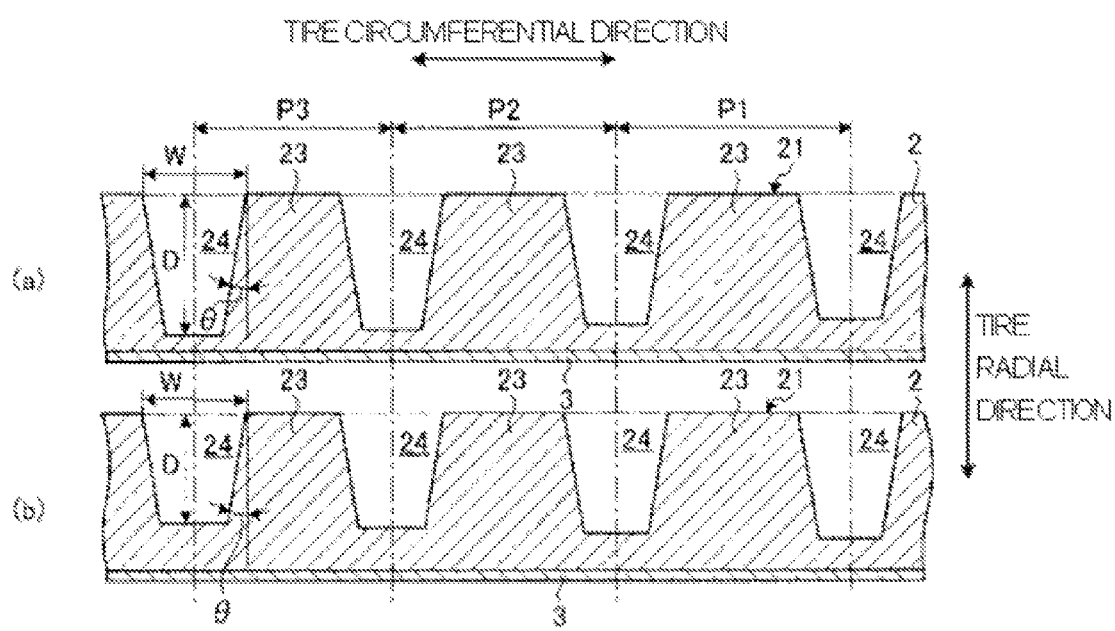
FIG. 4 is a simplified cross-sectional view in a tire circumferential direction of the lateral grooves illustrated in FIG. 1.

FIG. 4 illustrates an example where the volume ratio of the lateral grooves 24 with respect to the pitch volume is set by making the groove width W and the groove wall angle θ of the lateral grooves 24 constant while changing the groove depth D. Additionally, FIG. 4(a) illustrates the land portions 23 of the shoulder region Ws, and FIG. 4(b) illustrates the land portions 23 of the center region Wc. Moreover, in FIG. 4, centers of the lateral grooves 24 in the tire circumferential direction are illustrated as delimiters of the pitches, and the pitches are illustrated as becoming smaller from a pitch P1, to a pitch P2 and to a pitch P3.

Specifically, as illustrated in FIG. 4(a), in the shoulder region Ws of the tread portion 2, by increasing a groove volume by increasing the groove depth D as the pitch decreases (specifically, by deepening the lateral grooves 24), the volume ratio of the lateral grooves 24 with respect to the pitch volume thereof is set to be large. On the other hand, as illustrated in FIG. 4(b), in the center region Wc of the tread portion 2, by decreasing the groove volume by decreasing the groove depth D as the pitch decreases (specifically, by making the lateral grooves 24 shallower), the volume ratio of the lateral grooves 24 with respect to the pitch volume thereof is set to be small.

Thus, with the pneumatic tire 1 of the present embodiment, in the shoulder region Ws of the tread portion 2, as a pitch decreases the volume ratio of the lateral grooves 24 with respect to the pitch volume thereof is increased. Therefore, compared to a case where a variable pitch construction is employed in which the volume of the lateral grooves 24 is constant, because the volume ratio of the lateral grooves 24 increases as the pitch of the land portions 23 having small volumes decreases, the amount of vulcanized rubber pressed in during tire formation at each pitch (circumferential direction) is made uniform. As a result, poor uniformity in the shoulder region Ws, which can be a cause of vibration being generated in a steering wheel or a vehicle, can be improved.

On the other hand, with the pneumatic tire 1 of the present embodiment, in the center region Wc of the tread portion 2, as a pitch decreases the volume ratio of the lateral grooves 24 with respect to the pitch volume thereof is decreased. Therefore, compared to a case where a variable pitch construction is employed in which the volume of the lateral grooves 24 is constant, the stiffness of the land portions 23 at each pitch (circumferential direction) is made uniform because the volume ratio of the lateral grooves 24 decreases as the pitch of the land portions 23 having small volumes decreases. As a result, portions of the land portions 23 in the center region Wc experiencing extreme decreases in stiffness will be eliminated and, therefore, steering stability can be improved.

Therefore, according to the pneumatic tire 1 of the present embodiment, uniformity in the shoulder region Ws of the tread portion 2 is improved, steering stability based in the center region Wc is improved, and, because functions are divided, steering stability can be improved while uniformity is maintained in the pneumatic tire 1 employing a variable pitch construction.

Additionally, with the pneumatic tire 1 of the present embodiment, a difference (volume ratio difference) between a volume ratio of the lateral grooves 24 with respect to the pitch volume at a minimum pitch and a volume ratio of the lateral grooves 24 with respect to the pitch volume at a maximum pitch is preferably set to a range of from 0.5% to 1.5%. Specifically, in the shoulder region Ws, a volume ratio difference that is found by subtracting the volume ratio of the lateral grooves 24 with respect to the pitch volume at the maximum pitch from the volume ratio of the lateral grooves 24 with respect to the pitch volume at the minimum pitch is set to a range of from 0.5% to 1.5%; and in the center region Wc, a volume ratio difference that is found by subtracting the volume ratio of the lateral grooves 24 with respect to the pitch volume at the minimum pitch from the volume ratio of the lateral grooves 24 with respect to the pitch volume at the maximum pitch is set to a range of from 0.5% to 1.5%.

If the volume ratio difference in the shoulder region Ws is less than 0.5%, an amount of vulcanized rubber pressed in during tire forming at each pitch (circumferential direction) will not be uniform and improvements to uniformity will be minimal. On the other hand, if the volume ratio difference in the shoulder region Ws exceeds 1.5%, the stiffness of the land portions 23 at small pitches will decline, leading to a tendency for poor steering stability. Additionally, if the volume ratio difference in the center region Wc is less than 0.5%, the stiffness of the land portions 23 at each pitch (circumferential direction) will not be uniform and improvements to steering stability will be minimal. On the other hand, if the volume ratio difference of the center region Wc exceeds 1.5%, the stiffness of the land portions 23 at small pitches will not be satisfactorily improved and improvements to steering stability will be minimal.

EXAMPLES

In the examples, performance tests for steering stability (initial response) and uniformity were performed on a plurality of types of pneumatic tires under different conditions (see FIG. 5).

An evaluation method for steering stability included assembling pneumatic tires having a tire size of 175/65R15 on regular rims (a "standard rim" defined by the Japan Automobile Tire Manufacturers Association Inc. (JATMA), a "design rim" defined by the Tire and Rim Association, Inc. (TRA), or a "measuring rim" defined by the European Tyre and Rim Technical Organisation (ETRTO)). The pneumatic tires were inflated to an air pressure of 230 kPa and mounted on a test vehicle (1.3 liter class hatchback passenger vehicle, made in Japan). Then, a sensory evaluation of initial response by a driver when the test vehicle changed traveling lanes while traveling on a straight test course at 100 km/h was used to evaluate steering stability using a conventional example as a benchmark. Here, averages of evaluation scores by five drivers were calculated and shown as index scores against a benchmark of 100. Higher index scores are preferable as they indicate higher steering stability.

Additionally, an evaluation method for uniformity included assembling pneumatic tires having a tire size of 175/65R15 on regular rims (a "standard rim" defined by the Japan Automobile Tire Manufacturers Association Inc. (JATMA), a "design rim" defined by the Tire and Rim Association, Inc. (TRA), or a "measuring rim" defined by the European Tyre and Rim Technical Organisation (ETRTO)). The pneumatic tires were inflated to an air pressure of 200 kPa and a load of 3.43 kN was applied. A force variation tester was used to measure radial force variation (RFV) based on the stipulations of Japanese Automotive Standards Organization (JASO) C607. Here, for radial force variation, evaluation scores were calculated and are shown as index scores against the conventional example, which is a benchmark having a score of 100. Index scores for uniformity of 97 and above are considered to be good.

The pneumatic tire of the conventional example did not employ a variable pitch construction, and the lateral grooves having the same volume were provided at a constant pitch. On the other hand, the pneumatic tires of Examples 1 to 8 did employ a variable pitch construction. In the shoulder regions of the tread portion, as the pitch decreased a volume ratio of the lateral grooves with respect to the pitch volume thereof was increased; and, in the center region of the tread portion, as the pitch decreased a volume ratio of the lateral grooves with respect to the pitch volume thereof was decreased. Additionally, the volume ratio difference in the center regions and the volume ratio difference in the shoulder regions of pneumatic tires of Example 1 to Example 3 and Example 5 to Example 7 were set within the stipulated range (from 0.5% to 1.5%).

As shown by the test results of FIG. 5, each of the pneumatic tires of Example 1 through Example 8 was found to have increased steering stability while maintaining uniformity.

As described above, a pneumatic tire of the present technology is suitable for improving steering stability while maintaining uniformity for a pneumatic tire employing a variable pitch construction.

What is claimed is:

1. A pneumatic tire comprising a tread portion comprising:
   land portions comprising:
      vertical grooves provided in a tire circumferential direction and
      lateral grooves provided so as to intersect with the vertical grooves, the lateral grooves being disposed in the tire circumferential direction having a plurality of pitches, wherein
   in a shoulder region of the tread portion, whenever a pitch decreases a volume ratio of the lateral grooves with respect to a pitch volume thereof is increased; and, in a center region of the tread portion, as a pitch decreases the volume ratio of the lateral grooves with respect to a pitch volume thereof is decreased,
   the shoulder region is positioned on a tire width direction outer side of a center 60% of a distance between both edges of the tread portion in a tire width direction, and
   at least three different pitches are included in the shoulder region.

2. The pneumatic tire according to claim 1, wherein the volume ratio of the lateral grooves is set by changing a groove width of the lateral grooves.

3. The pneumatic tire according to claim 1, wherein the volume ratio of the lateral grooves is set by changing a groove wall angle of the lateral grooves.

4. The pneumatic tire according to claim 1, wherein the volume ratio of the lateral grooves is set by changing a groove depth of the lateral grooves.

5. The pneumatic tire according to claim 1, wherein a volume ratio difference between the volume ratio of the lateral grooves with respect to the pitch volume at a minimum pitch and the volume ratio of the lateral grooves with respect to the pitch volume at a maximum pitch is set to a range of from 0.5% to 1.5%.

6. The pneumatic tire according to claim 5, wherein a volume ratio difference defined by subtracting the volume ratio of the lateral grooves in the shoulder region with respect to the pitch volume at the maximum pitch from the volume ratio of the lateral grooves with respect to the pitch volume at the minimum pitch is set to a range of from 0.5% to 1.5%.

7. The pneumatic tire according to claim 5, wherein a volume ratio difference defined by subtracting the volume ratio of the lateral grooves in the center region with respect to the pitch volume at the minimum pitch from the volume ratio of the lateral grooves with respect to the pitch volume at the maximum pitch is set to a range of from 0.5% to 1.5%.

8. The pneumatic tire according to claim 1, wherein the tread portion comprises a vulcanized rubber.

9. The pneumatic tire according to claim 1, wherein in the shoulder region of the tread portion, as the pitch decreases the volume ratio of the lateral grooves with respect to a pitch volume thereof is increased by an increase in a groove depth as the pitch decreases.

10. The pneumatic tire according to claim 1, wherein in the center region of the tread portion, as the pitch decreases the volume ratio of the lateral grooves with respect to a pitch volume thereof is decreased by a decrease in a groove depth as the pitch decreases.

11. The pneumatic tire according to claim 1, wherein the volume ratio of the lateral grooves with respect to the pitch volume is set by making a groove width and a groove wall angle of the lateral grooves constant while changing a groove depth.

12. The pneumatic tire according to claim 1, wherein the volume ratio of the lateral grooves with respect to the pitch volume is set by making a groove width and a groove depth of the lateral grooves constant while changing the groove wall angle.

13. The pneumatic tire according to claim 1, wherein the volume ratio of the lateral grooves with respect to the pitch volume is set by making a groove wall angle and a groove depth of the lateral grooves constant while changing a groove width.

14. The pneumatic tire according to claim 1, wherein the volume ratio of the lateral grooves with respect to the pitch volume is set by changing at least one of a groove width (defined as a groove opening dimension in the tire circumferential direction) of the lateral grooves, a groove wall angle (defined as an angle of a groove wall with respect to a normal line of the tread surface in the tire circumferential direction) of the lateral grooves, and a groove depth of the lateral grooves.

* * * * *